United States Patent [19]

Loeb

[11] 4,072,641

[45] Feb. 7, 1978

[54] POLYAMIDE RESINS AND METHOD FOR MANUFACTURE

[75] Inventor: Melvin L. Loeb, Northbrook, Ill.

[73] Assignee: Kraftco Corporation, Glenview, Ill.

[21] Appl. No.: 625,824

[22] Filed: Oct. 28, 1975

[51] Int. Cl.² ............................................. C08G 69/26
[52] U.S. Cl. ................................. 260/18 N; 260/404.5
[58] Field of Search ......... 260/18 N, 404.5, 404.5 PA

[56] References Cited

U.S. PATENT DOCUMENTS

| | | | |
|---|---|---|---|
| 3,037,871 | 6/1962 | Floyd et al. | 260/18 N |
| 3,412,115 | 11/1968 | Floyd | 260/404.5 |
| 3,447,999 | 6/1969 | Rogier | 260/18 N |
| 3,502,602 | 3/1970 | Helm | 260/18 N |
| 3,522,270 | 7/1970 | Glaser | 260/18 N |
| 3,639,313 | 2/1972 | Gruber et al. | 260/18 N |
| 3,652,469 | 3/1972 | Glaser et al. | 260/18 N |
| 3,700,618 | 10/1972 | Sharkey et al. | 260/18 N |
| 3,786,007 | 1/1974 | Whyzmuzis et al. | 260/18 N |
| 3,793,270 | 2/1974 | Goukon et al. | 260/18 N |

*Primary Examiner*—Eugene C. Rzucidlo
*Attorney, Agent, or Firm*—Fitch, Even, Tabin & Luedeka

[57] ABSTRACT

Polyamide resins of fatty acids are prepared by reacting polymeric fatty acids, an alkylene diamine, monoaminoalcohol and a chain stopping agent which includes a particular branched chain monocarboxylic fatty acid which is liquid at room temperature. The use of this particular chain stopping agent provides polyamide resins which are resistant to gelling during storage.

8 Claims, No Drawings

POLYAMIDE RESINS AND METHOD FOR MANUFACTURE

The present invention relates to polyamide resins and more particularly relates to polyamides obtained by reacting polymeric fatty acids, an alkylene diamine, a monoaminoalcohol and a chain stopping monocarboxylic acid. The polyamide resins of the present invention are resistant to gelling and are useful as flexographic ink vehicles.

Flexographic inks are solvent based inks applied by rollers or pads to flexible sheets of paper and other substrates. Polyamide resins of polymeric fatty acids have been used in such inks as binder materials. However, solutions of polyamide resins of polymeric fatty acids have been subject to gelling in storage and it would be desirable to provide a polyamide resin of polymeric fatty acids which is resistant to gelling during storage.

It is known to use linear, non-branched chain, monocarboxylic fatty acids as chain stopping agents to prepare polyamide resins. The present invention is directed to the discovery that when at least a portion of the monocarboxylic chain stopping agents are branched chain, monocarboxylic fatty acids a polyamide resin is produced which is resistant to gelling.

Accordingly, it is a principal object of the present invention to provide a polyamide resin which is resistant to gelling during storage.

It is another object of the present invention to provide a polyamide resin suitable for use as a flexographic ink binder.

It is a further object of the present invention to provide a flexographic ink vehicle having a polyamide binder resistant to gelling.

The polyamide resins of fatty acids of the present invention are prepared by reacting polymeric fatty acids, an alkylene diamine, other difunctional compounds and a monocarboxylic chain stopping agent which includes branched chain, monocarboxylic fatty acids. When at least a portion of the monocarboxylic chain stopping agent is selected from particular branched chain mono carboxylic fatty acids which are liquid at room temperature, the polyamide resins produced are resistant to gelling.

Reaction conditions are not critical and the reaction conditions for the preparation of the polyamide resins may be varied widely. Generally, the reaction is carried out at a temperature within the range of from about 150° C to about 250° C. Preferably the reaction is carried out at about 230° C. The time of reaction depends somewhat on temperature, but normally a time period of from about 1 to about 10 hours after reaching the selected temperature is suitable. The preferred time of reaction is about 3 hours. Vacuum may be used during the later stages of heating to withdraw volatile materials and to keep the polyamide resin reaction product from contact with the air which may cause darkening. Also, an inert gas sweep may be used to avoid contact with air and to remove volatile material.

The preferred alkylene diamines are the primary diamines of the aliphatic series, especially alpha omega diprimary aliphatic amines, such as ethylene diamine, 1,3-propane diamine, tetramethylene diamine and hexamethylene diamine. Minor proportions of aromatic diamines may be included in the reaction mixture. Examples of suitable aromatic diamines are phenylene diamines and xylylene diamines.

Other difunctional compounds, particularly aminoalcohols, which react with the polymeric fatty acids can be used in the reaction. It is preferred to use a mixture of a diamine and an aminoalcohol. The preferred aminoalcohol is monoethanolamine.

Preferably, the polyamide resins are prepared from reaction mixtures wherein the number of amine groups and hydroxyl groups employed is substantially equivalent to the total number of carboxylic groups supplied by the ploymeric fatty acid and the fatty acid chain stopping agent. However, slight excesses of up to about 10% of either caboxylic groups or amine and alcohol groups may be used. The chain stopping agents are present in the reaction mixture at a level sufficient to contribute from about 2 to 20 percent of the total carboxylic groups present. For most flexographic ink applications, the chain stopping agents preferably contribute from about 8 to about 16 percent of the total carboxylic groups.

Suitable polymeric fatty acids are those resulting from the polymerization of saturated, ethylenically unsaturated, and acetylenically unsaturated naturally occuring and synthetic monobasic fatty acids containing from 8–24 carbon atoms. It is preferred to use polymeric fatty acids known commercially as "dimerized fatty acids" and "dimers". Dimers generally contain little monomer but trimer and high polymers are usually present in amounts up to about 25%. Suitable dimer acids can be made by the method of U.S. Pat. No. 2,482,761 but it is not intended to limit the scope of the present invention to polymeric fatty acids made in accordance with this patent.

Saturated fatty acids are difficult to polymerize but polymerization can be effected at elevated temperatures with a peroxide catalyst, such as di-t-butyl peroxide. Suitable saturated fatty acids include branched chain and straight chain acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid, neutral or alkaline clays, di-t-butyl peroxide, boron trifluoride and other Lewis acids, anthraquinone, sulfur dioxide and the like. Suitable monomers include branched chain, straight chain, poly- and mono-ethylenically unsaturated acids, such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid, and chaulmoogric acid.

The acetylenically unsaturated fatty acids are easily polymerized by simply heating the acids. Polymerization of these highly reactive materials will occur in the absence of catalysts. However, the acetylenically unsaturated acids occur only rarely in nature and are expensive to synthesize. Any acetylenically unsaturated fatty acid, both straight chain and branched chain, both monounsaturated and polyunsaturated, are useful monomers for the preparation of the polymeric fatty acids.

Suitable examples of such materials include 10-undecynoic acid, tariric acid, stearolic acid, behenolic acid, and isanic acid.

Because of their ready availability and relative ease of polymerization, oleic and linoleic acid are the preferred starting materials for the preparation of the polymeric fatty acids. Mixtures of these fatty acids are found in tall oil fatty acids. Tall oil fatty acids are the preferred source for the preparation of polymeric fatty acids useful in the present invention to provide non-gelling polyamide resins.

Typical compositions of commercially available polymeric fatty acids based on the polymerization of tall oil fatty acids are:

| Component | Level % by Weight |
|---|---|
| $C_{18}$ monobasic acids | Less than 2 |
| $C_{36}$ dibasic acids | 75 – 96 |
| $C_{54}$ tribasic acids (and higher) | 4 – 25 |

These mixtures may be fractionated by suitable means, such as high vacuum molecular distillation, so as to obtain compositions having higher levers of dimer acids where desired.

The polyamide resins of fatty acids of the present invention can be modified by including in the reaction mixture other acid components. For example, hydroxy aliphatic acids, such as lactic, glycolic, β-hydroxypropionic, α-hydroxy-n-caproic, β-methylpropylhydrocrylic, tetramethylhydrocrylic, β-hydroxy-α-diethylbutyric, salicylic, phenylglycolic and phenyllactic acids; aliphatic hydrocarbon acids containing from 2 to 18 carbon atoms, such as acetic, propionic, butyric, octanoic, lauric, stearic, oleic, linoleic, or linolenic acids; and relatively low molecular weight, aliphatic hydrocarbon dicarboxylic acids having from 4 to 10 carbon atoms, such as azaleic, sebacic, adipic, and suberic acids can be used. These acids serve as modifiers which affect the melting point, alcohol solubility and other characteristics when some special characteristic is desired. While these modifiers may be employed when desired to modify some special characteristics, they do not materially change the overall characteristics of the polyamides of the present invention, particularly where gel resistance is concerned. This is particularly true if the modifying acid is not employed in excess of about 10 equivalent percent based on the total equivalents of acid employed.

The chain stopping agents of the present invention include particular branched chain monocarboxylic fatty acids which are liquid at room temperature. In general, the branched chain, monocarboxylic fatty acids useful as chain stopping agents in the present invention to provide polyamide resins which are resistant to gelling are $C_{16}$ – $C_{20}$ saturated or unsaturated fatty acids wherein at least one carbon of the fatty acid is branched from the fatty acid backbone. The total number of carbon atoms in the branching groups is usually between 1 and 5. The branching groups are predominantly methyl groups, but a small proportion (less than 10 percent) may be ethyl, propyl or butyl groups. The branching groups may be branched from any carbon in the backbone. Usually there will be a random distribution of branching groups and the size of branching groups will be random, but will usually be predominately methyl groups.

The branched chain, monocarboxylic fatty acid chain stopping agents may be in admixture with from about 0 to about 90 percent by weight of non-branched chain fatty acids. Such admixture is suitable to provide the benefits of the invention but the effect on providing non-gelling properties is proportional to the level of branched chain fatty acids present. A particularly preferred branched chain fatty acid is a commercially available fatty acid containing from about 70 to 85 percent of branched chain fatty acids. Such fatty acid product is available under the tradename Industrene M, from Humko Sheffield Chemicals.

The following Examples further illustrate various features of the present invention but are not intended to in any way limit the scope of the invention which is defined in the appended claims.

Several polyamides (Examples 1–6) are produced by the following procedure. Data in respect to the materials used and the properties of the polyamide produced are set forth below in Table I.

The partial reaction mixture of a polymeric fatty acid and a monocarboxylic chain stopping fatty acid are charged into a round bottom 3-necked resin flask fitted with a thermometer, mechanical stirrer, condensor and trap. The mixture is stirred, blanketed with nitrogen and heated to a temperature of 160° C. At this point the heating and the nitrogen sweep are halted while the diamine is added slowly. Once all of the diamine has been added to the reaction mixture, the temperature is increased to 230° C and maintained for 3 hours. The product is removed from the flask, cooled and analyzed.

In the Examples set forth below in Table I, all percentages are by weight unless specifically noted otherwise.

TABLE I

| EXAMPLE NO. | 1 | 2 | 3 | 4 | 5 | 6 |
|---|---|---|---|---|---|---|
| Reaction Temp. ° C | 230 | 230 | 230 | 230 | 230 | 230 |
| ACIDIC MOIETIES: | | | | | | |
| Polymeric Fatty Acid: | Hystrene 3680[1] | Hystrene 3680 | Empol 1018[2] | Empol 1018 | Hystrene 3695[1] | Hystrene 3695 |
| Level of Use (% of total acid) | 88 | 88 | 88 | 88 | 88 | 88 |
| % Monomer | trace | trace | trace | trace | 1 | 1 |
| % Dimer | 83 | 83 | 83 | 83 | 95 | 95 |
| % Trimer | 17 | 17 | 17 | 17 | 4 | 4 |
| Acid No. | 190–197 | 190–197 | 188–196 | 188–196 | 194–198 | 194–198 |
| Sap. No. | 191–199 | 191–199 | 192–198 | 192–198 | 198–202 | 198–202 |
| Monocarboxylic Chain Stopping Agent: | Hystrene 9018[3] | Industrene[4]M | Hystrene 9018 | Industrene M | Hystrene 9018 | Industrene M |
| Level of Use (% of total acid) | 12 | 12 | 12 | 12 | 12 | 12 |
| Iodine Value | 0.05 max | 80–95 | 0.05 max | 80–95 | 0.05 max | 80–95 |
| Titer (° C) | 65–67 | 25–35 | 65–67 | 25–35 | 65–67 | 25–35 |
| Acid No. | 196–201 | 175–190 | 196–201 | 175–190 | 196–201 | 175–190 |
| Sap No. | 197–202 | 180–200 | 197–202 | 180–200 | 197–202 | 180–200 |
| % Unsap. | 2.5% max | 5% max. | 2.5% max. | 5% max. | 2.5% max. | 5% max. |
| % Branched Chain | 0 | 70–85 | 0 | 70–85 | 0 | 70–85 |

TABLE I-continued

| EXAMPLE NO. | 1 | 2 | 3 | 4 | 5 | 6 |
| --- | --- | --- | --- | --- | --- | --- |
| BASIC MOIETIES: | | | | | | |
| Diamine: | Ethylene Diamine | Ethylene Diamine | Ethylene Diamine | Ethylene Diamine | Ethylene Diamine | Ethylene Diamine |
| Level of Use (% of total base) | 78 | 78 | 78 | 78 | 78 | 78 |
| Amino Alcohol: | Monoethanol Amine | Monoethanol Amine | Monoethanol Amine | Monoethanol Amine | Monoethanol Amine | Monoethanol Amine |
| Level of Use (% of total base) | 22 | 22 | 22 | 22 | 22 | 22 |
| Polyamide Produced | | | | | | |
| Acid No. | 3.4 | 3.6 | .3.5 | 3.0 | 3.8 | 2.4 |
| Amine No. | 3.2 | 3.0 | 2.1 | 2.3 | 1.9 | 2.3 |
| Melting Point (° C) | 103 | 94–96 | 104–107 | 94–96 | 102–106 | 96–98 |
| Viscosity (cP at 190° C) | 410 | 604 | 558 | 724 | 320 | 400 |
| Gel time, Hours to form moderately firm gel: | | | | | | |
| Formulation A[5] | < 16 | ∞ | < 16 | ∞ | 64 | ∞ |
| Formulation B[6] | 64 | ∞ | 40 | ∞ | 216 | ∞ |

[1] Commercially available dimer fatty acids from Humko-Sheffield Chemical Operation of Kraftco Corp.
[2] Commercially available dimer fatty acids available from Emery Industries, Inc.
[3] Commercially available purified fatty acids having a high level of stearic acid from Humko-Sheffield Chemical Operation of Kraftco Corp.
[4] Commercially available unrefined mixture of fatty acids having a high level of branched chain fatty acids from Humko-Sheffield Operation of Kraftco Corp.
[5] Solvent solution of the polyamide resin of the Example, containing 40 percent by weight of the polyamide resin and 10 percent of a commercially available polyamide resin.
[6] Solvent solution of the polyamide resin of the Example, containing 40 percent by weight of the polyamide resin.

What is claimed is:

1. A polyamide resin resistant to gelling comprising the polycondensation reaction product of a reaction mixture of an alkylene diamine, a polymeric fatty acid and a monocarboxylic fatty acid chain stopping agent, said polymeric fatty acid having less than about 2 percent by weight of monobasic acids, from about 75 to 96 percent by weight of dibasic acids and from about 4 to about 25 percent by weight of tribasic or higher acids, said chain stopping agent including a branched chain monocarboxylic acid which is liquid at room temperature and which is selected from the group consisting of $C_{16}$ – $C_{20}$ saturated and unsaturated fatty acids wherein there are from 1 to 5 total carbons in the branching groups and the branching groups are from $C_1$ – $C_4$, the total number of amine groups and hydroxyl groups (if any) in said reaction mixture being substantially equivalent and no more than about 10 percent more or less than the total number of carboxylic groups provided by said polymeric fatty acid and said monocarboxylic fatty acid chain stopping agent, said chain stopping agent contributing from about 8 to about 16 percent of the total carboxylic groups.

2. A polyamide resin in accordance with claim 1 wherein said branched chain, monocarboxylic acid is isostearic acid.

3. A polyamide resin in accordance with claim 1 wherein said reaction mixture includes an aminoalcohol.

4. A polyamide resin in accordance with claim 3 wherein said amino alcohol is monoethanol amine.

5. A process for preparing a polyamide resin having resistance to gelling by the polycondensation reaction of a reaction mixture including an alkylene diamine, polymeric fatty acid and a monocarboxylic, fatty acid chain stopping agent, said polymeric fatty acid having less than about 2 percent by weight of monobasic acids, from about 75 to 96 percent by weight of dibasic acids and from about 4 to about 25 percent by weight of tribasic or higher acids, said chain stopping agent including a branched chain monocarboxylic acid which is liquid at room temperature, and which is selected from the group consisting of $C_{16}$ – $C_{20}$ saturated and unsaturated fatty acids wherein there are from 1 to 5 total carbons in the branching groups and the branching groups are from $C_1$ – $C_4$, the total number of amine groups and hydroxyl groups (if any) in said reaction mixture being substantially equivalent and no more than about 10 percent more or less than the total number of carboxylic groups provided by said polymeric fatty acid and said monocarboxylic fatty acid chain stopping agent, said chain stopping agent contributing from about 8 to about 16 percent of the total carboxylic groups.

6. A process in accordance with claim 5 wherein said branched chain, monocarboxylic acid is isostearic acid.

7. A process in accordance with claim 5 wherein said reaction mixture includes an aminoalcohol.

8. A process in accordance with claim 5 wherein said amino alcohol is monoethanol amine.

* * * * *